United States Patent [19]

Higashi et al.

[11] Patent Number: 4,675,752

[45] Date of Patent: Jun. 23, 1987

[54] APPARATUS FOR RECORDING AND/OR REPRODUCING VIDEO SIGNALS

[75] Inventors: Housei Higashi, Shimizu; Takao Terayama, Ushiku; Hideo Nishijima; Hiroshi Nakamura, both of Katsuta, all of Japan

[73] Assignee: Hitachi, Ltd., Tokyo, Japan

[21] Appl. No.: 760,622

[22] Filed: Jul. 30, 1985

[30] Foreign Application Priority Data

Jul. 30, 1984 [JP] Japan .................. 59-157495

[51] Int. Cl.⁴ .............................................. H04N 5/78
[52] U.S. Cl. ..................................... 360/10.3; 360/70
[58] Field of Search ................... 360/10.3, 10.2, 70, 360/73; 358/312, 335

[56] References Cited

U.S. PATENT DOCUMENTS 4,190,869 2/1980 Ota ..................................... 360/10.2
4,246,616 1/1981 Hiraguri et al. .
4,611,252 9/1986 Igata et al. ......................... 360/10.3

FOREIGN PATENT DOCUMENTS 138457 4/1985 European Pat. Off. .......... 360/10.3

Primary Examiner—Aristotelis M. Psitos
Attorney, Agent, or Firm—Antonelli, Terry & Wands

[57] ABSTRACT

An apparatus for recording and/or reproducing video signals on a magnetic tape wherein a capstan and driving motor are coupled by a belt for driving the tape. The motor is connected to a power supply circuit through a switching circuit and voltage is applied from the switching circuit to the motor for driving the belt and therewith the tape. The motor driving voltage application time is controlled to be substantially equal to an integer multiple of the reciprocal of the resonance frequency of the belt driving system.

6 Claims, 12 Drawing Figures

APPARATUS FOR RECORDING AND/OR REPRODUCING VIDEO SIGNALS

FIELD OF THE INVENTION

The present invention relates generally to an apparatus for reproducing and/or reproducing video signals from a magnetic tape and more specifically to such an apparatus capable of allowing a magnetic tape to travel intermittently by rotating, and suspending the rotation of, the capstan for regenerating slow motion picture images.

BACKGROUND OF THE INVENTION

Heretofore, an apparatus for reproducing video signals from a magnetic tape in such a manner of obtaining a standard reproduction picture, a still reproduction picture, or a time-lapse reproduction picture have been used for a picture image regenerating purposes. A slow motion reproduction is one reproduction method intended to regenerate slow picture images and, as means of realizing such a reproduction, there has been proposed a method comprising causing a magnetic tape to stop and travel repeatedly and intermittently in harmony with the rotation of a magnetic head as shown in U.S. Pat. No. 4,246,616 issued on Jan. 20, 1981 with the title of "System for reproducing a video signal in a slow motion or still picture reproduction".

As magnetic tape driving systems for a magnetic reproduction apparatus, there are the directly coupled type wherein a capstan and its driving motor are directly coupled and a belt-driven type wherein the capstan and its driving motor are coupled by a belt. In the directly coupled type, the magnetic tape is allowed to travel intermittently at a uniform speed without vibration by directly controlling the capstan driving motor speed. However, in the belt-driven type, the capstan vibrates when the motor is started and stopped because of vibration imparted by the belt which drives the capstan. Transitional vibration is particularly noticeable when the motor is stopped. The vibration thus generated causes the amount of magnetic tape fed per revolution to vary thereby changing the position of a noise-bar which is a region wherein the S/N ratio of reproduced pictures is made worse when a level of reproduction signals is low, distorting the picture image, and then causing the quality of the pictures to become worse.

SUMMARY OF THE INVENTION

An object of the present invention is to provided an apparatus for recording and/or reproducing video signals capable of regenerating slow motion picture images without causing noise and distortion therein.

To attain the above object, the apparatus for recording and/or reproducing video signals according to the present invention is so constructed that a capstan and a driving motor are coupled by a belt, the motor being connected to a power supply circuit through a switching circuit, and a voltage is applied from the switching circuit to the motor to drive the capstan intermittently and further a motor driving voltage application time by means of the switching circuit is set so as to be an integer multiple of the reciprocal of or a value close to the reciprocal of the resonant frequency of the belt driving system, thereby suppressing the residual vibration generated in the belt driving system when the magnetic tape is intermittently driven.

DETAILED DESCRIPTION OF THE PREFERRED EMBODIMENTS

Figure 1:
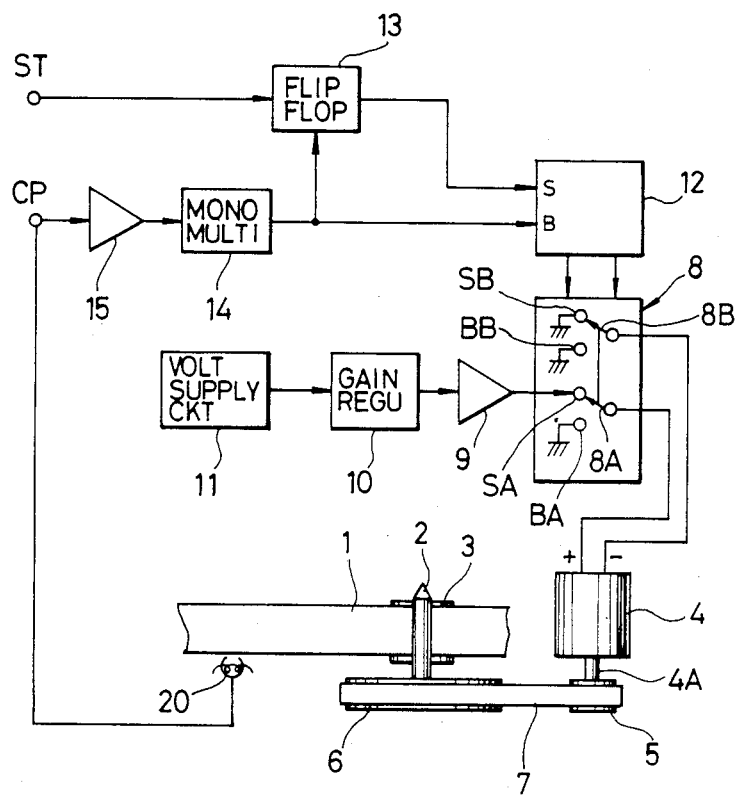
FIG. 1 is a diagram of an embodiment of the present invention.

Referring to FIG. 1, a magnetic tape 1 is sandwiched in between a capstan 2 and a pinch roller 3 and is driven to travel as the capstan 2 rotates. The capstan 2 is driven by a motor 4 through a motor pulley 5 coupled to the shaft 4A of the motor 4, a capstan pulley 6 coupled to the capstan 2 and a belt 7 which connects the motor and capstan pulleys 5, 6. The motor 4 is connected to a starting voltage supply circuit 11 through a switching circuit 8, a motor driving amplifier 9 and a gain regulator 10. The switching circuit 8 is equipped with a movable contact 8A and its fixed contacts SA, BA and an auxiliary movable contact 8B and its fixed contacts SB, BB to disconnect the starting voltage supply circuit 11 from the motor 4. The movable contact 8A and the auxiliary movable contact 8B are connected to the motor 4. The switching circuit 8 is controlled by a switch control circuit 12. The terminal S of the switching circuit 8 is connected to a flip flop 13 to which a start signal ST is applied to allow the magnetic tape to travel intermittently. The terminal B of the switch control circuit 12 is connected to a monostable multivibrator 14. The output of the monostable multivibrator 14 goes to the terminal B of the switch control circuit 12 and also to the flip flop 13 as a reset signal. To the monostable multivibrator 14, a control pulse signal CP amplified by an amplifier 15 is applied; the control pulse signal CP has been recorded in the magnetic tape 1 and is read out by the control head 20.

Figure 2:
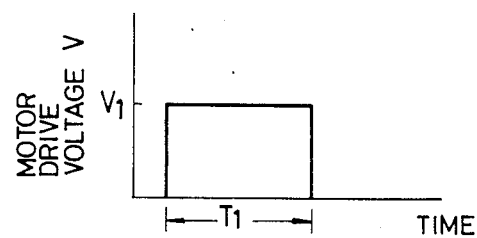
FIG. 2 shows a waveform of a motor driving voltage to be applied in the embodiment of the system shown in FIG. 1.

As shown in FIG. 2, the embodiment of the system above is of the so called short control type causing the motor 4 to stop by closing the switch 8 after applying voltage $V_1$, which is obtained from the voltage supply circuit 11 through the gain regulator 10, for time $T_1$. When a control pulse signal CP is input to the amplifier 15 from the control head 20, the output signal of the amplifier 15 is input to the monostable multivibrator 14. When the motor driving voltage V is given as voltage $V_1$, the motor driving voltage V application time $T_1$ is set in the monostable multivibrator 14. The frequency spectrum V* of the motor driving voltage V is expressed by the following equation (1) according to Fourier transformation:

$$V^* = \frac{V_1}{\pi f} \sin \pi f T_1 \quad (1)$$

Wherein;
f ... frequency
π ... the circular constant

Figure 3A:
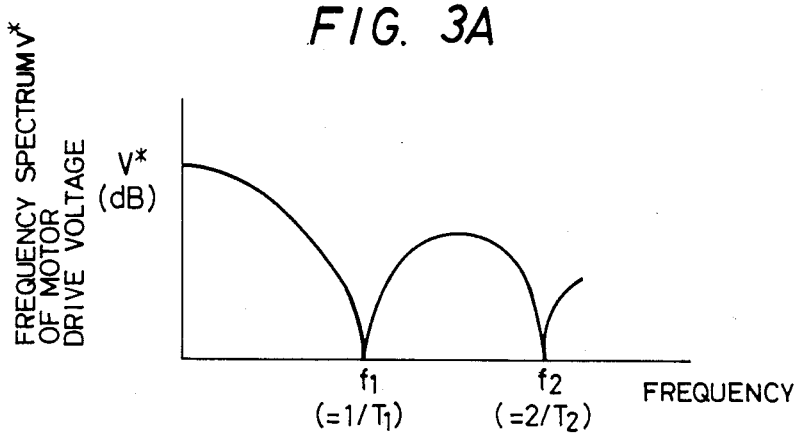
FIG. 3A shows a spectrum distribution chart of the motor driving voltage shown in FIG. 2.

In FIG. 3A, the horizontal axis shows frequency, and the vertical axis shows the level of the frequency spectrum. The waveform of the frequency spectrum V* is shown as FIG. 3A according to the equation (1). As apparent from FIG. 3A, the distribution of the frequency spectrum V* of the motor driving voltage has a frequency band ranging from $f_1, f_2, \ldots$, causing the frequency spectrum V* to become zero and the frequencies $f_1, f_2, \ldots$, which appear an integral number of times, $1/T_1$, is dependent on the motor driving voltage application time $T_1$.

Figure 3B:
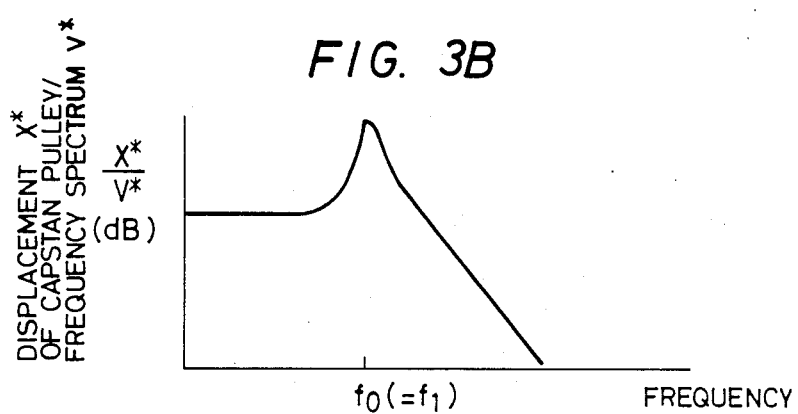
FIG. 3B shows a frequency response of a displacement of capstan pulley corresponding to the motor driving voltage in the system shown in FIG. 1.
Figure 3C:
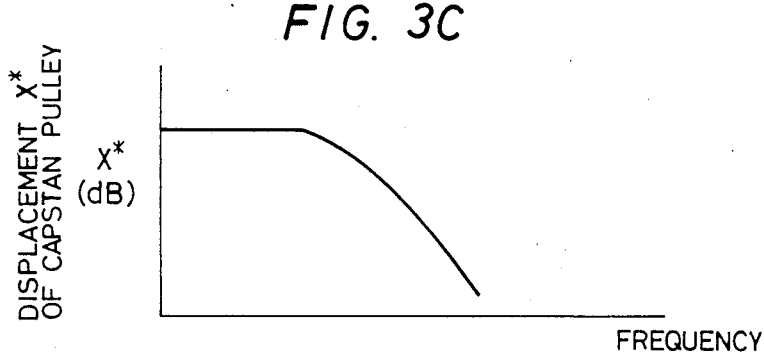
FIG. 3C shows the frequency response of displacement of a capstan pulley at the motor driving voltage shown in FIG. 2.

On the other hand, the frequency response of the displacement X* of the capstan pulley corresponding to the driving voltage V* of the motor 4 comprising the system of the motor 4, the belt 7, and the capstan pulley 6, is shown as FIG. 3B having a mechanical resonance point $f_0$. The response of the system having the frequency response shown in FIG. 3B corresponding to the input shown in FIG. 3A can be obtained by multiplying the both characteristics of FIGS. 3A and 3B, and expressed as shown in FIG. 3C. When $f_1$ equals to $f_0$, the peak of the resonance point shown in FIG. 3B can be depressed, and the system changes to a non-vibrational system in which the response of the actual capstan pulley 6 is reduced as shown in FIG. 3C. Consequently, the motor driving voltage application time is set so as to be an integer multiple of the reciprocal of the resonant frequency $f_0$ of the belt driving system to suppress the starting vibration of the belt driving system including the belt 7 and the residual vibration when the system is stopped.

The operation of the system embodying the present invention will now be described.

When a trigger pulse is applied to the flip flop 13 by means of the start signal ST to cause the tape to start traveling intermittently, the flip flop 13 applies its output to the terminal S of the switch control circuit 12. The switch control circuit 12 switches over the movable contacts 8A, 8B of the switching circuit 8 to the fixed contacts SA, SB, so that the motor driving voltage $V_1$ from the start voltage supply circuit 11 is supplied to the motor 4 through the gain regulator 10 and the switching circuit 8. Accordingly, the motor 4 transmits torque to the capstan 2 through the belt 7 and the capstan 2 causes, in cooperation with the pinch roller 3, the tape 1 to travel.

As the magnetic tape 1 travels, the control pulse signal CP is input to the monostable multivibrator 14 through the amplifier 15. The monostable multivibrator 14 is set by the control pulse signal CP, and an output signal of the monostable multivibrator 14 is delayed by time t after the monostable multivibrator 14 receives the control pulse signal CP. The monostable multivibrator 14 applies its output to the flip flop 13 as a reset signal when the time has been set, the output being simultaneously supplied to terminal B of switch control circuit 12. Then the switch control circuit 12 switches over the movable contacts 8A, 8B of the switching circuit 8 to the fixed contacts BA, BB so that the motor 4 has a shunt across its terminals, causing the motor 4 and the capstan 2 to stop.

Time $T_1$ from starting of the motor 4 after the flip flop 13 is set to stopping of the motor 4 by the output signal of the monostable multivibrator 14, is decided by a torque load which is impressed to the motor 4 for driving the magnetic tape 1 and an applied voltage $V_1$ to the motor 4. The time $T_1$ decides a running length of the magnetic tape 1 by one travel intermittently by rotation. By adjusting the monostable multivibrator 14, the applied voltage $V_1$ to the motor 4 is set in the manner that time of the applied voltage to the motor 4 is to be $T_1$. When the applied voltage $V_1$ is increased, the time $T_1$ is decreased. When the applied voltage $V_1$ is decreased, the time $T_1$ is increased. The delay time t which is set by the control pulse signal CP and the action of the monostable multivibrator 14, is used for adjusting the stop position of the magnetic tape 1.

As the magnetic tape 1 is allowed to travel intermittently, it becomes possible to regenerate a slow motion picture image. The residual vibration of the belt driving system which is produced when the magnetic tape travels intermittently is suppressed by the motor driving voltage application time $T_1$ which has been set to be an integer multiple of the reciprocal of the resonant frequency $f_0$ of the belt driving system. A high quality picture image is thus available, because the noise bar within the regenerative slow motion picture image will not change its position.

Figure 4:
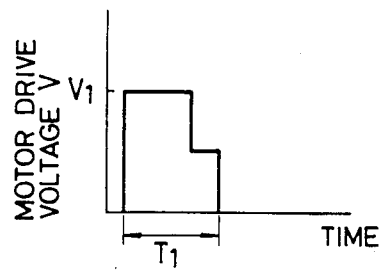
FIGS. 4 and 5 show other examples of motor driving voltage waveforms in the present invention.
Figure 5:
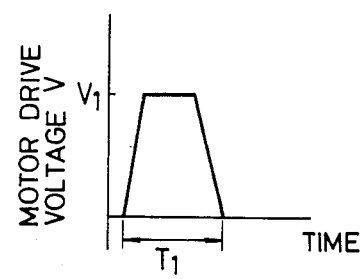

In the above-described example, the set voltage application time $T_1$ value need not conform precisely to $1/f_0$; if it is within ±10%, it will pose no problem in practice. Moreover, the set motor voltage waveform need not be perfectly square as shown in FIG. 2; the voltage immediately prior to damping may be reduced step by step as shown in FIG. 4; or the voltage at the time of starting and damping may be allowed to change gradually as shown in FIG. 5. Moreover, it is unnecessary in the above example, regulating both the voltage level and the application time heretofore carried out, to correct variations in the characteristics and load torque of the motor proper and the characteristic values of the circuit elements, except for regulating the voltage level with the gain regulator 10, so that regulating can be made simpler.

Figure 7:
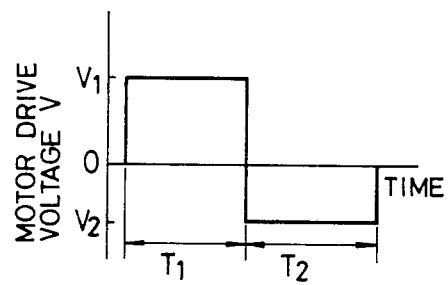
FIG. 7 is a diagram illustrating an example of the waveform of voltage to be applied to the motor in another embodiment of the system shown in FIG. 6.
Figure 6:
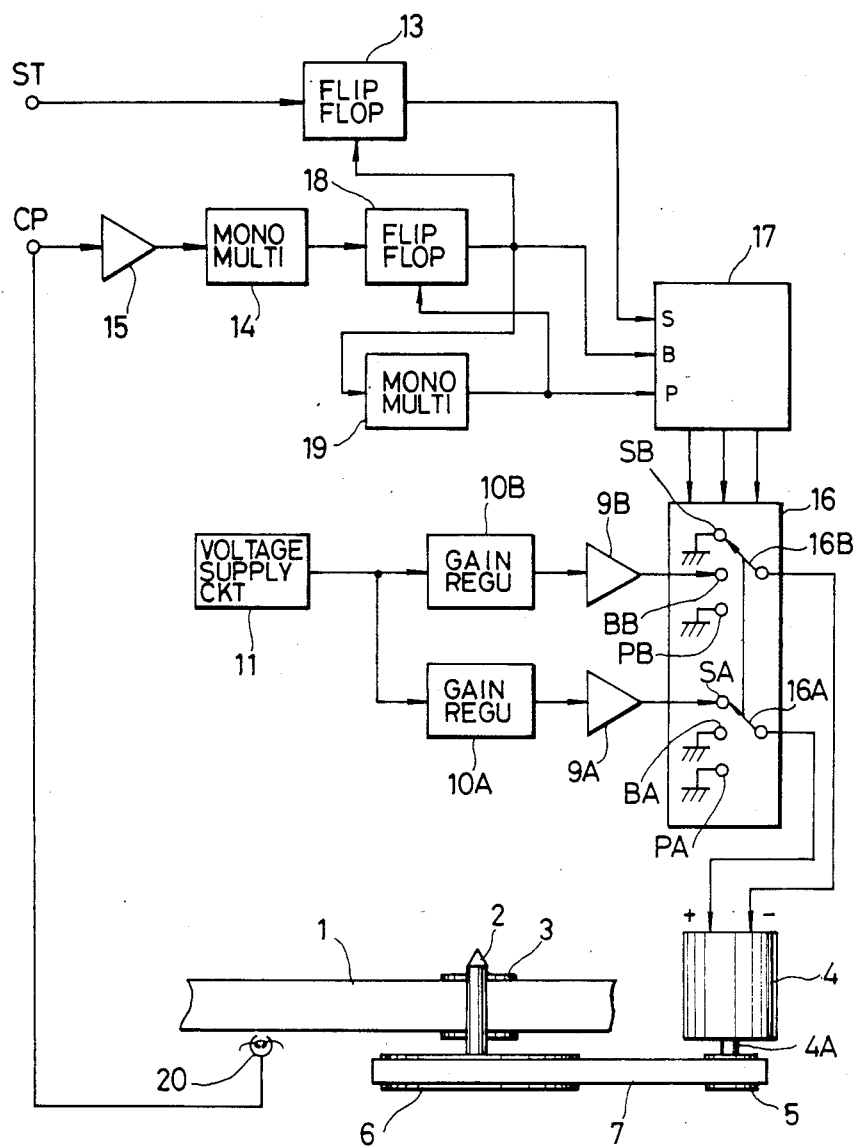
FIG. 6 is a diagram of another embodiment of the present invention.

FIG. 6 shows another embodiment of the present invention wherein like reference characters designate like parts of FIG. 1. In FIG. 6, the movable contacts 16A, 16B of a switching circuit 16 are connected to a motor 4. The switching circuit 16 is equipped with fixed contacts SA, SB BA, BB, and PA, PB opposite the movable contacts 16A, 16B, respectively. The fixed contact SA is connected to a start voltage supply circuit 11 through a motor driving amplifier 9A and a gain regulator 10A, where as the fixed contact BB is connected to the start voltage supply circuit 11 through a motor driving amplifier 9B and a gain regulator 10B. A switch control circuit 17 which operates the switching circuit 16 is equipped with terminals S, B, P on its input side. The terminal S of the switch control circuit 17 is connected to a flip flop 13, the terminal B to a flip flop 18 and the terminal P to a monstable multivibrator 19. The monostable multivibrator 19 operates on receiving an output signal from the flip flop 18 but because the delay time is set at voltage application time $T_2$ to damp the motor as shown in FIG. 7, it outputs a signal to the switch control circuit 17 after the end of that time and also a reset signal to the flip flop 18. Moreover, the voltage application time $T_1$ is set in the monostable multivibrator 14 as in the case of the example of FIG. 1 to start the motor as shown in FIG. 7. The application times $T_1$, $T_2$ are set to satisfy the following equation (2):

$$T_1 = T_2 = 1/f_0 \qquad (2)$$

The operation of the system embodying FIG. 6 will be described.

When a trigger pulse is applied to the flip flop 13 by means of a start signal ST to allow the tape to travel intermittently, the flip flop 13 applies its output to the terminal S of the switch control circuit 17. Consequently, the switch control circuit 17 causes the movable contacts 16A, 16B of the switching circuit 16 to contact the fixed contacts SA, SB, respectively. As a result, the voltage of the start voltage supply circuit 11 is adjusted to voltage $V_1$ by the gain regulator 10A and applied to the +terminal of the motor 4 through the motor driving amplifier 9A. The motor 4 thus transmits torque to the capstan 2 through the belt 7, whereby the capstan 2 causes, in cooperation with the pinch roller 3, the magnetic tape 1 to travel.

As the magnetic tape 1 travels, a control pulse signal CP is applied to the monostable multivibrator 14 through the amplifier 15. The monostable multivibrator 14 sends its output to the flip flop 18. The flip flop 18 applies a reset signal to the flip flop 13 on receiving the output above and a signal to the terminal B of the switch control circuit 17 and the monostable multivibrator 19. Since the switch control circuit 17 switches the movable contacts 16A, 16B of the switching circuit 16 from the fixed contacts SA, SB to the fixed contacts BA, BB, the voltage of the start voltage supply circuit 11 is adjusted to the voltage $V_2$ by the gain regulator 10B and applied to one terminal of the motor 4 through the motor driving amplifier 9B. Damping voltage $V_2$ is thus applied to the motor 4. As the damping voltage $V_2$ application time $T_2$ is set in the monostable multivibrator 19, the monostable multivibrator 19 adds a reset signal to the flip flop 18 after the set time $T_2$ has elapsed and also its output to the terminal P of the switching control 17. Consequently, the switch control circuit 17 switches over the movable contacts 16A, 16B of the switching circuit 16 to the fixed contacts PA, PB and releases the damping voltage intended for the motor 4. As a result, the capstan 2 stops.

Although the above-described intermittent traveling of the magnetic tape 1 results in the regeneration of a slow motion picture image, the residual vibration of the belt driving system derived from the intermittent traveling of the magnetic tape 1 at the time of the regeneration is controllable during the voltage application time $T_1$, $T_2$ set to be an integer multiple of the reciprocal of the resonant frequency $f_0$ of the belt driving system. Consequently, the noise bar within a slow motion regenerative picture image is prevented from changing its position and image quality is enhanced.

Figure 8:
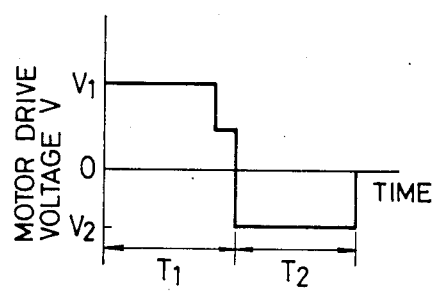
FIGS. 8 through 10 are diagrams illustrating other examples of waveforms of the voltage to be applied to the motor shown in FIG. 6.
Figure 9:
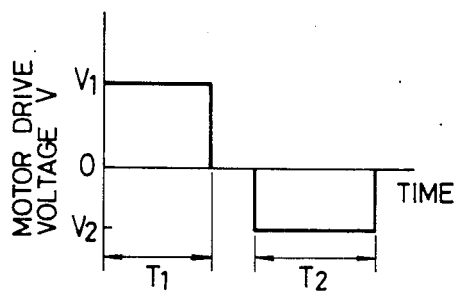
Figure 10:
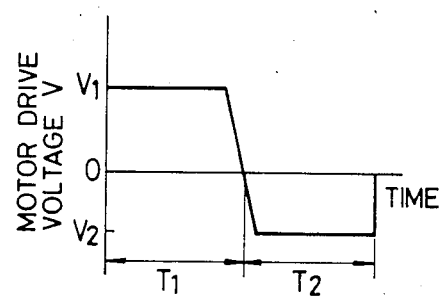

In this case, the voltage application time $T_1$, $T_2$ need not be precisely $1/f_0$ as in the case of the previous example; in practice, a tolerance of $\pm 10\%$ is acceptable. The waveform of the voltage to be applied need not be the perfect square wave shown in FIG. 7. The voltage at the time of switching the motor voltage may be reduced in stages as shown in FIG. 8 to protect the motor driving circuit. Moreover, as shown in FIG. 9, a quiescent period may be provided, and the voltage at the time of switching may be allowed to change slowly as shown in FIG. 10.

As set forth above, it is possible according to the present invention to reduce the residual vibration of a belt driving system which occurs when a tape is made to travel intermittently for the regeneration of a slow motion picture image. This will result in a high quality image because the noise bar within the regenerative picture image is not allowed to change position.

What we claim is:

1. An apparatus for recording and/or reproducing video signals on a magnetic tape, comprising a capstan and a driving motor being coupled by a belt, the motor being connected to a power supply circuit through a switching circuit, means for applying a voltage from said switching circuit to said motor to drive said capstan intermittently, and means for controlling the motor driving voltage application time of the voltage applying means to be set to be substantially equal to an integer multiple of the reciprocal of the resonant frequency of the belt driving system, so as to enable suppression of residual vibration generated in the belt driving system when the magnetic tape is driven intermittently.

2. An apparatus as defined in claim 1, wherein the controlling means includes means for detecting a control pulse signal on the magnetic tape, and means for operating said switching circuit according to said set voltage application time.

3. An apparatus as defined in claim 2, wherein said switching circuit includes contacts for shunting the connection of said motor therewith.

4. An apparatus as defined in claim 3, wherein the controlling means includes a monostable multivibrator responsive to said control pulse signal for controlling the voltage application time.

5. An apparatus as defined in claim 2, wherein said switching circuit includes contacts for switching said motor from the start to the damping voltage application side.

6. An apparatus as defined in claim 5, wherein the controlling means includes a first monostable multivibrator responsive to the control pulse signal for controlling the voltage application time, a flip flop responsive to the signal from said first monostable multivibrator, and a second monostable multivibrator responsive to the signal from the flip-flop for controlling a damping voltage application time.

* * * * *